United States Patent
Wagner et al.

(10) Patent No.: US 9,152,874 B2
(45) Date of Patent: Oct. 6, 2015

(54) MOTION BLUR AWARE VISUAL POSE TRACKING

(71) Applicant: QUALCOMM Incorporated, San Diego, CA (US)

(72) Inventors: Daniel Wagner, Vienna (AT); Youngmin Park, Vienna (AT); Qi Pan, Vienna (AT)

(73) Assignee: QUALCOMM Incorporated, San Diego, CA (US)

(*) Notice: Subject to any disclaimer, the term of this patent is extended or adjusted under 35 U.S.C. 154(b) by 163 days.

(21) Appl. No.: 13/801,601

(22) Filed: Mar. 13, 2013

(65) Prior Publication Data

US 2014/0270348 A1    Sep. 18, 2014

(51) Int. Cl.
G06T 7/00 (2006.01)
G06T 19/00 (2011.01)
G06T 7/20 (2006.01)
G06K 9/32 (2006.01)

(52) U.S. Cl.
CPC ............ *G06K 9/3241* (2013.01); *G06T 7/0044* (2013.01); *G06T 7/0071* (2013.01); *G06T 19/006* (2013.01); *G06T 7/20* (2013.01); *G06T 2207/10016* (2013.01); *G06T 2207/20201* (2013.01)

(58) Field of Classification Search
CPC ............... G06T 7/0071; G06T 2207/20201; G06T 19/006; G06T 7/20
USPC ................................................. 382/103, 264
See application file for complete search history.

(56) References Cited

U.S. PATENT DOCUMENTS

| | | | |
|---|---|---|---|
| 5,686,960 A * | 11/1997 | Sussman et al. ........... | 348/218.1 |
| 7,683,962 B2 | 3/2010 | Border et al. | |
| 8,154,607 B2 | 4/2012 | Ozluturk | |
| 8,213,737 B2 | 7/2012 | Steinberg et al. | |
| 2011/0199493 A1 | 8/2011 | Steinberg et al. | |
| 2011/0286631 A1* | 11/2011 | Wagner et al. ................ | 382/103 |
| 2012/0051628 A1 | 3/2012 | Noguchi et al. | |
| 2012/0224068 A1 | 9/2012 | Sweet, III | |

FOREIGN PATENT DOCUMENTS

EP    1594322 A2    11/2005

OTHER PUBLICATIONS

Hinterstoisser, S.; Kutter, O.; Navab, N.; Fua, P.; Lepetit, V., "Real-time learning of accurate patch rectification," Computer Vision and Pattern Recognition, 2009. CVPR 2009. IEEE Conference on , vol., no., pp. 2945,2952, Jun. 20-25, 2009.*

(Continued)

*Primary Examiner* — Utpal Shah
(74) *Attorney, Agent, or Firm* — Berkeley Law & Technology Group, LLP (57) ABSTRACT

Various methods, apparatuses and/or articles of manufacture are provided which may be implemented for use by an electronic device to track objects across two or more digital images. For example, an electronic device may generate a plurality of warped patches corresponding to a reference patch of a reference image, and combine two or more warped patches to form a blurred warped patch corresponding to the reference patch with a motion blur effect applied to a digital representation corresponding to a keypoint of an object to be tracked.

16 Claims, 4 Drawing Sheets

(56) References Cited

OTHER PUBLICATIONS

Wagner, Daniel; Reitmayr, Gerhard; Mulloni, Alessandro; Drummond, Tom; Schmalstieg, D., "Real-Time Detection and Tracking for Augmented Reality on Mobile Phones," Visualization and Computer Graphics, IEEE Transactions on, vol. 16, No. 3, pp. 355,368, May-Jun. 2010.*

Hinterstoisser S., et al., "Learning Real-Time Perspective Patch Rectification", International Journal of Computer Vision, Kluwer Academic Publishers, BO, vol. 91, No. 1, Sep. 15, 2010, pp. 107-130, XP019871902, ISSN: 1573-1405, DOI: 10.1007/S11263-010-0379-X abstract sections 4.1, 4.3.

International Search Report and Written Opinion—PCT/US2014/025147—ISA/EPO—Jul. 15, 2014.

Liu, et al., "Simultaneous Image Formation and Motion Blur Restoration Via Multiple Capture," 2001 IEEE International Conference on Acoustics, Speech, and Signal Processing, vol. 3, pp. 1841-1844.

* cited by examiner

MOTION BLUR AWARE VISUAL POSE TRACKING

BACKGROUND

1. Field

The subject matter disclosed herein relates to electronic devices, and more particularly to methods, apparatuses and articles of manufacture for use by an electronic device to track objects across two or more digital images based, at least in part, on applying a motion blur effect to a keypoint of a reference digital image.

2. Information

Various object identification and tracking techniques have been developed and continue to be developed to support computer vision. By way of example, certain techniques have been developed to provide for feature (e.g., keypoint) detection and matching of objects across different digital images, e.g., a sequence of digital images captured at different times, a video stream, etc.

The uses of computer vision appear endless. One early use of such technology included the use of computer vision for manufacturing robots to identify certain objects involved in the manufacturing process. In such instances, it may be possible to provide a significant amount of processing power and a plethora of sensors and/or cameras to assist in the processing of what may be a fairly static scene and/or at least a predictable dynamic scene.

One dramatic use of computer vision, as of recent, is its use to "augment reality" for a user of a portable electronic device. Here, for example, a portable electronic device may use computer vision techniques to identify and track certain objects within a surrounding environment, and upon recognizing its surroundings may overlay additional information on the real time video that is captured and displayed to the user. Hence, for example, a user of a mobile phone may augment certain objects, such as particularly businesses, products, services, information, etc.

Unfortunately, unlike the example of robust manufacturing robots in a fairly controlled environment, a portable electronic device may have limited processing power and find itself in an environment that may be extraordinarily dynamic at times, e.g., user walking through a busy shopping mall, an airport terminal, etc.

For these and other reasons, there is a continuing need for techniques that may be applied to computer vision, and particularly to identify and possibly track objects in dynamically active environments in an efficient manner.

SUMMARY

In accordance with certain aspects, a method, which may be implemented in electronic device, may comprise: identifying a reference patch corresponding to at least a portion of an object as represented in a reference digital image, the reference patch representing at least a keypoint of the object to track within a plurality of digital images; generating a plurality of warped patches corresponding to the reference patch by selectively applying modeled pose change effects to a digital representation of the keypoint; and combining at least two of the plurality of warped patches to form a blurred warped patch corresponding to the reference patch with a motion blur effect applied to the digital representation keypoint.

In accordance with certain other aspects, an apparatus may be provided for use in electronic device. The apparatus may comprise: means for identifying a reference patch corresponding to at least a portion of an object as represented in a reference digital image, the reference patch comprising at least a keypoint of the object to track within a plurality of digital images; means for generating a plurality of warped patches corresponding to the reference patch by selectively applying modeled pose change effects to a digital representation of the keypoint; and means for combining at least two of the plurality of warped patches to form a blurred warped patch corresponding to the reference patch with a motion blur effect applied to the digital representation keypoint.

In accordance with still other aspects, an electronic device may be provided which comprises memory, and a processing unit to: identify a reference patch corresponding to at least a portion of an object as represented in a reference digital image, the reference patch comprising at least a keypoint of the object to track within a plurality of digital images; generate a plurality of warped patches corresponding to the reference patch by selectively applying modeled pose change effects to a digital representation of the keypoint; and combine at least two of the plurality of warped patches to form a blurred warped patch corresponding to the reference patch with a motion blur effect applied to the digital representation keypoint.

In accordance with yet another aspect, an article of manufacture may be provided which comprises a non-transitory computer readable medium having stored therein computer implementable instructions executable by a processing unit in electronic device to: identify a reference patch corresponding to at least a portion of an object as represented in a reference digital image, the reference patch comprising at least a keypoint of the object to track within a plurality of digital images; generate a plurality of warped patches corresponding to the reference patch by selectively applying modeled pose change effects to a digital representation of the keypoint; and combine at least two of the plurality of warped patches to form a blurred warped patch corresponding to the reference patch with a motion blur effect applied to the digital representation keypoint.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Various object identification and tracking techniques have been developed and continue to be developed to support computer vision. By way of example, certain techniques have been developed to provide for feature (e.g., keypoint) detection and matching of objects across two or more digital images.

Such example techniques may also apply or otherwise make use of various warping techniques and/or the like to selectively transform and/or otherwise affect all or part of an image to account for certain changes (e.g., modeled pose changes) that may affect how a tracked object appears within a digital image of a static or dynamic scene.

By way of example, a warping technique and/or the like may affect all or part of an image to account for changes relating to the camera used to capture digital image. For example, a modeled pose change may relate to a viewpoint of the camera, a change in an image scale captured by the camera, a change in a field of view of the camera, a change in an orientation of the camera, a change in an exposure time of the captured image, etc. Accordingly, a warping technique and/or the like may affect all or part of an image to account for changes relating to how one or more objects may appear within a particular digital image as a result of variations in the positioning, operation, etc., of the camera over time.

Furthermore, certain warping techniques and/or the like may affect all or part of an image to account for changes relating to how one or more objects may appear within a particular digital image as a result of changes within a dynamic scene. Hence, a modeled pose change may relate to various types of movement (e.g., one or more of six degrees of freedom (6DOF) that an object may experience. Thus, for example, a modeled pose change may relate to upward or downward translation movements, translation movements to the right or left, translation movements away from or towards the camera, rotational movements affecting a pitch of the object, rotational movements affecting a yaw of the object, and/or rotational movements affecting a roll of the object.

Some real time and off-line techniques applied in computer vision assume that digital images are not affected by a camera's exposure time, possibly because such exposure times tend to be very short relative to certain movements of an object within a scene, possibly because the camera and scene are presumed static during such exposure times, or possibly because of computational constraints.

Nonetheless, in certain instances, particularly with regard to portable electronic devices such as mobile phones—the position of a camera relative to a scene may not be static for the duration of the exposure time, which may lead to motion blur in a digital image. Likewise, motion blur may be introduced to a digital image during its exposure time as result of the movement of one or more objects within a scene. As may be expected, an amount of motion blur appearing in all or part of a digital image may vary, and tends to increase as the exposure time increases. Accordingly, an amount of motion blur appearing in all or part of a digital image may be reduced or possibly even avoided given a sufficiently short enough exposure time, e.g., with respect to the various movements. However, shorter exposure times may not be available for selection, and/or even proper for desired results. Instead, as is well known, an exposure time may be selected based on various factors relating to the image capture unit (e.g., a capability and/or operational setting of the camera and/or camera lens, supporting electronics, etc.) the scene (e.g., an amount of light, etc.), certain desired results (e.g., based on user inputs, etc.), and/or the like or some combination thereof.

In accordance with certain aspects, techniques are provided herein which may be implemented to account for and/or possibly measure certain motion blur that may be introduced into one or more digital images captured over a period of time, e.g., such as a sequence of images, a video stream, etc.

More specifically and by way of an initial example, techniques are provided herein which may be implemented to estimate a motion blur effect for at least a portion (e.g., a reference patch which is substantially unblurred) of a reference digital image for an object to track over a plurality of digital images. In certain instances, a blurred warped patch corresponding to a particular reference patch may be generated based, at least in part, on a motion blur effect. More specifically, for example, a motion blur effect may be applied to intentionally blur a digital representation of a keypoint of the object identified in the reference patch. Furthermore, in certain instances, a modeled pose change effect may be applied to warp the digital representation of the keypoint.

Accordingly, in certain instances a blurred warped patch may be generated which represents a selectively blurred and warped version of a reference patch corresponding to at least one identified keypoint of an object to track. Thus, for example, a tracker function and/or the like may determine whether a blurred warped patch satisfactorily matches at least a portion of a digital image.

In accordance with certain implementations, various iterative and/or adaptive techniques may be used to generate and test various candidate blurred warped patches in an effort to identify a satisfactory match. In accordance with certain implementations, techniques may be applied to estimate an amount of motion blur for at least a portion of a particular digital image, e.g., based, at least in part, on identifying a satisfactorily applied motion blur effect. Furthermore, as may be appreciated, knowledge of such an estimated amount of motion blur may be taken into consideration in generating candidate blurred warped patches corresponding to a subsequent digital image.

Those skilled in the art should recognize that the availability of such blurred warped reference patches may significantly increase tracking robustness, quality and/or speed. Particular implementations may, for example, provide more accurate and robust tracking under motion blur, which may reduce processing time and power consumption.

Those skilled in the art should also recognize that the techniques provided herein may be implemented in a variety of electronic devices, including, for example, portable electronic devices that may capture and generate all or part of a sequence of digital images, a video stream, etc., in real time, and/or otherwise process of all or part of such content in real time and/or off-line.

In accordance with certain example implementations, an electronic device may identify at least one reference patch corresponding to at least a portion of an object as represented in at least one reference digital image. Here, for example, such a reference patch may comprise at least one keypoint of the object to track, e.g., within a sequence of images, a video stream, etc. The electronic device may, for example, generate at least one blurred warped patch corresponding to a reference patch based, at least in part, on at least one motion blur effect applied to the keypoint. The electronic device may, for example, determine whether a blurred warped patch satisfactorily matches at least a portion of at least one digital image.

In accordance with certain example implementations, an electronic device may, for example, generate at least one blurred warped patch corresponding to at least one reference patch based, at least in part, on at least one modeled pose change effect applied to warp at least one digital representation of at least one keypoint.

In accordance with certain example implementations, an electronic device may, for example, generate at least one blurred warped patch corresponding to at least one reference patch based, at least in part, on a "backward mapping" approach. For example, in certain backward mapping approaches, a plurality of digital image samples may be obtained which represent a given keypoint at a plurality of points in time, wherein the keypoint position in the digital image samples remains unchanged while the position from which the patches are sampled in a reference image varies.

Thus, for example, an electronic device may generate a blurred warped patch by combining a plurality of digital image samples to generate a motion blur effect. For example, in certain instances an electronic device may combine corresponding portions of a plurality of digital image samples using pixel averaging, and/or the like, e.g. as part of a backward mapping approach.

In accordance with certain example implementations, a blurred warped patch may be based on a single digital image sample, such that an electronic device may determine that a keypoint is sufficiently absent of blur, e.g., in response to a determination that the blurred warped patch produces a satisfactory match. Hence, in certain instances, an initial blurred warped patch may be based on a single digital sample of a reference image to determine whether or not a current digital image may or may not be sufficiently blurred to continue with one or more additional blurred warped patches, e.g., with some blur applied.

In accordance with certain example implementations, an electronic device may, for example, in response to a determination that a blurred warped patch failed to produce a satisfactory match, selectively generate a subsequent blurred warped patch corresponding to a reference patch based, at least in part, on another (different) motion blur effect applied to the keypoint.

In accordance with certain example implementations, an electronic device may, for example, identify a second reference patch corresponding to at least another portion of an object as represented in at least one reference digital image. Here, for example, a second reference patch may comprise a second keypoint of an object to track in two or more digital images. Further, in certain example implementations, in response to a determination that a motion blur effect as estimated for an object satisfies a threshold level of accuracy, an electronic device may generate at least one second blurred warped patch corresponding to at least one second reference patch based, at least in part, on a motion blur effect applied to the second keypoint.

In accordance with certain example implementations, an electronic device may, for example, selectively scale at least a portion of one or more of: a reference digital image, a digital image sample, and/or a digital image.

Figure 1:
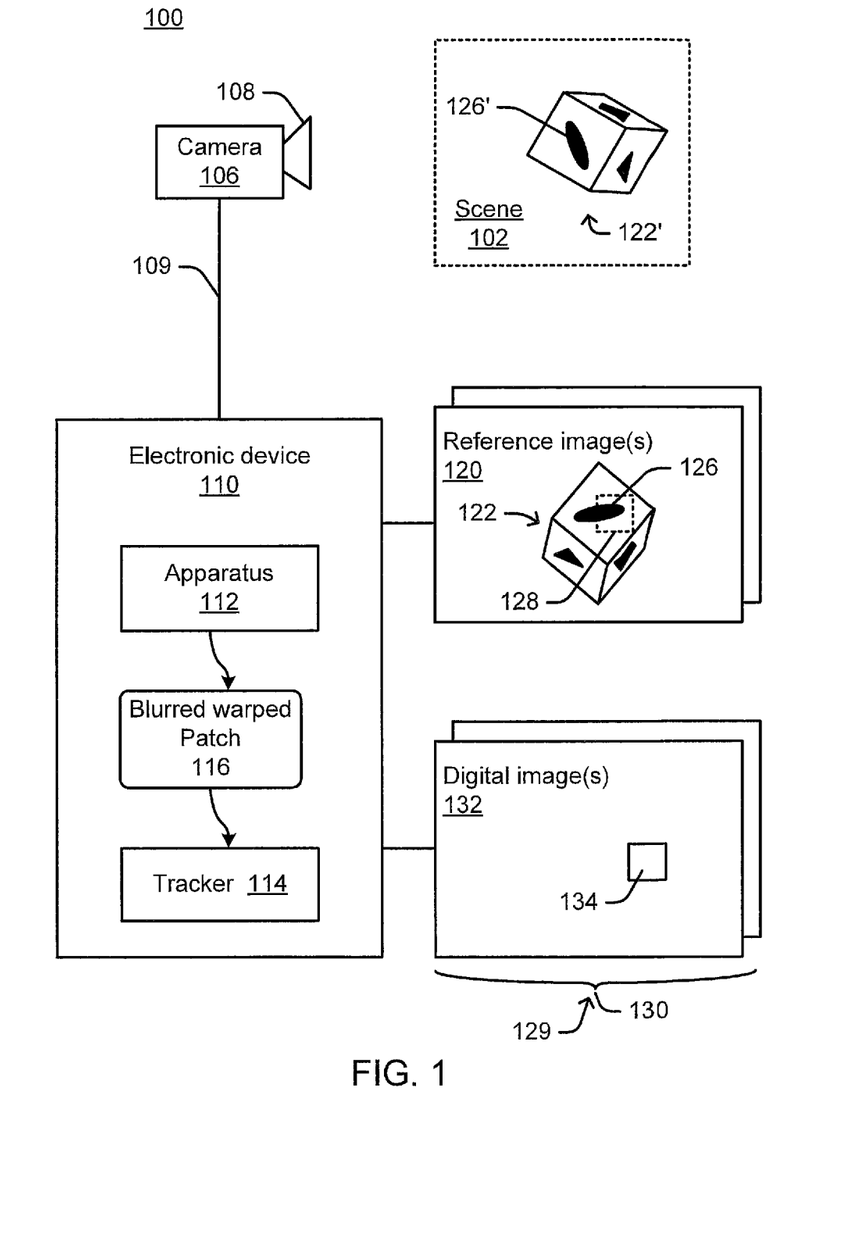
FIG. 1 is a schematic block diagram illustrating an arrangement of representative electronic devices including at least one electronic device to track objects across two or more digital image based, at least in part, on an application of a motion blur effect to a keypoint of a reference digital image, in accordance with an example implementation.

Attention is now drawn to FIG. 1, which is a schematic block diagram illustrating an arrangement 100 of representative electronic devices including at least one electronic device 110 to track objects across digital images 132 in a sequence of images 129, a video stream 130, etc. based, at least in part, on an application of a motion blur effect to a digital representation of at least a keypoint 126 of an object 122 a reference digital image 120, in accordance with an example implementation.

As illustrated, electronic device 110 may comprise an apparatus 112 to generate or assistant in generating a blurred warped patch 116, which may be considered by a motion blur aware visual pose tracker 114. In this example, blurred warped patch 116 may correspond to a reference patch 128, which is illustrated within a reference image 120 as part of the digital representation of object 122. As further illustrated, reference patch 128 may comprise at least one keypoint 126, which is illustrated here as part of a visual feature of object 122. Reference image 120 in this example comprises a two-dimensional projection of object 122 which in this example is intended to represent a three-dimensional object 122' in actual space, e.g., within a scene 102.

As previously mentioned, scene 102 may in certain instances represent a static scene wherein object 122' remains stationary, at least during an exposure time associated with capturing digital image 132. Thus, while a static scene should not introduce any motion blur in digital image 132, such motion blur may still occur as result of camera 106 moving during at least a portion of an exposure time associated with capturing digital image 132. In other instances, scene 102 may represent a dynamic scene wherein object 122' may be moving in some manner during at least a portion of an exposure time associated with capturing digital image 132. Hence, motion blur may be introduced in digital image 132 by the dynamic scene, and/or as a result of camera 106 moving during at least a portion of an exposure time associated with capturing digital image 132.

In this example, a camera 106 is illustrated as comprising a lens 108 which may permit selective capturing of digital image 132. In this example, electronic device 110 is illustrated as being connected to camera 106 via connection 109. Here, connection 109 is intended to represent all or part of one or more other devices, connections, networks, and/or the like or any combination thereof through which electronic device 110 may obtain digital images 129 and/or video stream 130; digital images 1 to 9 and/or video stream 130 having been generated, at least in part, by camera 106. Thus, for example, in certain instances connection 109 may represent an image capture unit (which may include camera 106) and which may process, store, forward, and/or otherwise handle in some manner one or more electronic signals representing data and/or computer implementable instructions corresponding to all or part of digital images 129 and/or video stream 130. Further, it should be understood that connection 109 may represent one or more wired or fiber-optic connections, and/or one or more wireless communication links.

While camera 106 is illustrated in FIG. 1 as being connected to electronic device 110, it should be kept in mind that in certain other implementations electronic device 110 may comprise camera 106, as well as lens 108. Some clear examples of such electronic devices includes a variety of portable electronic devices such as cellular telephones, smart phones, tablet computers, laptop computers, wearable computers, digital cameras, etc. Thus, for example connection 109 may represent an internal connector and/or various circuits within an electronic device 110.

In certain example implementations, apparatus 112 may identify reference patch 128 corresponding to at least a portion of object 122 as represented in a reference image 120, and generate blurred warped patch 116 corresponding to reference patch 128 based, at least in part, on a motion blur effect, e.g., applied to at least keypoint 126. As presented herein, reference patch 128, blurred warped patch 116, and portion 134 of digital image 132 may each comprise an array of pixels of a particular size. Accordingly, such an array of pixels may comprise an array of N×M pixels, wherein N and M may each represent an integer value greater than two, and wherein in certain instances N may equal M. Thus, by way of a non-limiting example, in certain implementations N=8 and M=8. As illustrated by portion 134 of digital image 132, it is assumed that portion 134 is significantly smaller than the two-dimensional array of pixels comprising digital image 132.

As previously mentioned, in certain example implementations, to generate blurred warped patch 116, apparatus 112 may also apply a modeled pose change effect to warp a digital representation of at least keypoint 126.

Apparatus 112 and/or tracker 114 may subsequently determine whether blurred warped patch 116 satisfactorily matches at least a portion 134 of digital image 132.

In a particular example implementation, keypoint 126 in object 122 may be identified to enable tracking pose (position and orientation) of the object across the digital images. Point-based methods may, for example, match keypoints by comparing support areas in the image (patches covering or visually representing keypoints). These methods may allow finding the pose of an object by matching a sufficient number of keypoints between reference image(s) 120 and digital image(s) 132. Accordingly, example tracker 114 may compare as any number of keypoints until some goal or threshold (e.g., one hundred matches) is satisfied. Keypoint matches in a reference image may then be used to characterize the pose of the object relative to the camera.

In a particular implementation, instead of comparing clean (non-blurred) reference patches from a reference image against blurred patches from a current camera image, blurred warped patches 116 may be generated from corresponding reference patches, e.g., by applying one or more motion blur effects so that the blurred warped patches may better visually represent the keypoints as captured in digital image(s) 132. Such techniques may, for example, enable improved matching with reduced processing because fewer keypoints may need to be processed until a targeted number of matching portions in a digital image have been found.

In a particular implementation, multiple images captured with very short exposure may be used to approximate an imaging process of a single image with a longer relative exposure time (see FIG. 2 below). As previously mentioned, generation of these samples may be significantly independent of a blur that is to be approximated; therefore, efficient methods (simple bilinear warping, etc.) may be used. Accordingly, in certain implementations, blurred warped patch 116 may be generated, at least in part, using a pixel averaging operation, e.g. applied to temporal sample patches over a keypoint in the reference image. Since, in certain example implementations, each sample may be created by affinely warping based on 6DOF camera pose information, a blurred warped patch may be processed to correctly model arbitrary camera motions including zoom, which may not always be dealt with by pure two-dimensional full-image blurring operation, e.g., as provided in certain digital still photo enhancement applications, etc.

Figure 2:
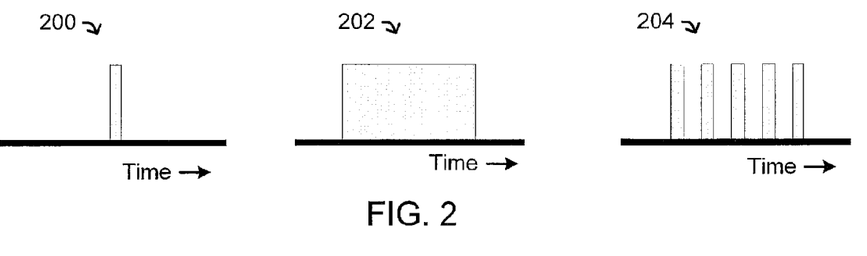
FIG. 2 comprises three time line graphs illustrating exposure times for an example single digital image sample, an example digital image, and an example plurality of digital image samples, the latter of which may be adapted for use in applying a motion blur effect to a keypoint of a reference digital image, in accordance with an example implementation.

Accordingly, FIG. 2 comprises a first time line graph 200 illustrating an exposure time (width on time line) for an example single digital image sample that may be short enough to be sufficiently absent of blur, a second time line graph 202 illustrating a relatively longer exposure time for an example digital image that may be long enough to result in some blur, and a third time line graph 204 illustrating how a relatively longer exposure time as in time line graph 202 may be approximated by combining a plurality of digital image samples. Accordingly, in certain instances a plurality of digital image samples may be combined for use in applying a motion blur effect to a keypoint of a reference digital image. While third time line graph 204 comprises five digital image samples, it should be kept in mind that in other example implementations, a plurality of digital image samples may comprise two or more digital image samples.

In certain example implementations, an overall period of time for capturing a plurality of digital image samples, e.g. as in third time line graph 204, may be substantially equal to a duration of an exposure time for a digital image, e.g. as in second time line graph 202.

In accordance with certain aspects, an effort for creating blurred patches may be directly related to a number of samples needed per blurred warped patch. By way of example, a number of samples may depend on an amount of motion blur expected or being modeled. Thus, for relatively small amounts of motion blur, in certain instances only a few samples may be necessary, indeed, in the case of extremely little if any noticeable blur only a single sample may be necessary. The number of samples may depend, for example, on how accurately one wishes to approximate the blurring kernel. With this in mind, however, in certain instances it may be possible to limit the number of samples taken while achieving a certain level of accuracy. Thus, for example, in certain implementations, one may be able to rely on eight samples or less, however claimed subject matter is not intended to be so limited.

Figure 3:
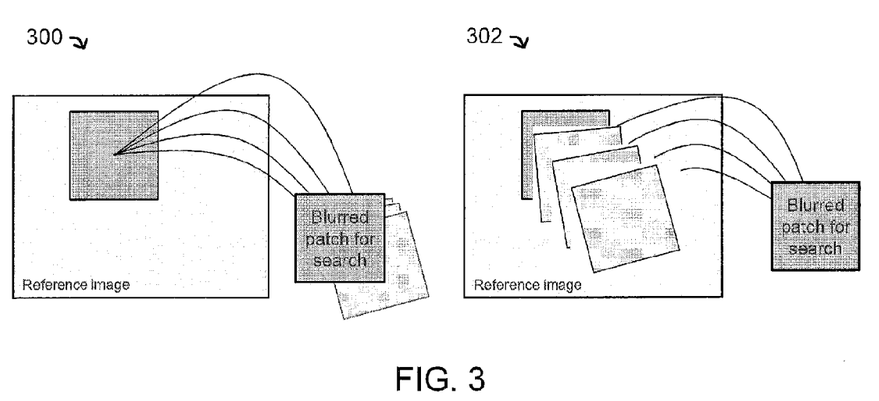
FIG. 3 comprises two schematic diagrams illustrating an example forward mapping technique and an example backward mapping technique, one or more which may be adapted for use in applying a motion blur effect to a keypoint of a reference digital image, in accordance with an example implementation.

As previously mentioned, blurred warped patches 116 may be generated by applying a motion blur effect and/or a modeled pose change effect using various mapping and/or other like known warping/transforming techniques, such as, e.g. a forward mapping technique as represented by schematic diagram 300 in FIG. 3, a backward mapping technique as represented by schematic diagram 302 in FIG. 3, and/or the like or some combination thereof. In certain example implementations, a backward mapping technique as represented by schematic diagram 302 may prove more efficient than a forward mapping technique as represented by schematic diagram 300.

As mentioned, in certain instances, to generate blurred warped patch 116 a plurality of digital image samples (each of which may each be substantially unblurred) may be combined. With backwards mapping, a keypoint position in the camera image may remain unchanged while a position from which the patches are sampled in the reference image vary. Here, the digital image samples may have a uniform size (e.g. 8×8 pixels), and may be combined to generate, at least in part, blurred warped patch 116, e.g. using simple per-pixel averaging operations, and/or the like.

Figure 4:
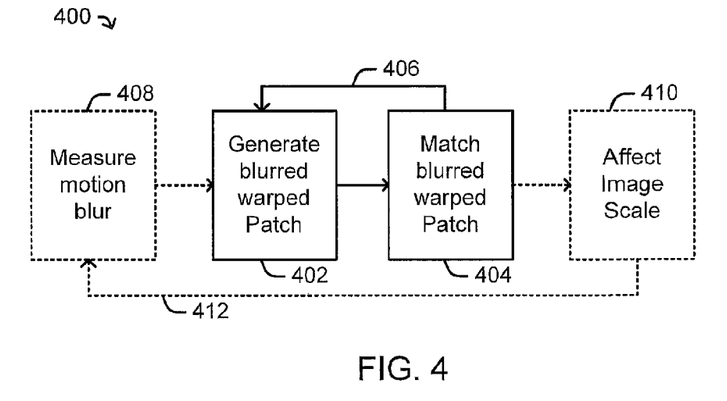
FIG. 4 is a schematic block diagram illustrating an example workflow that may implemented within an electronic device to support motion blur aware visual pose tracking, in accordance with an example implementation.

Attention is drawn next to FIG. 4, which is a schematic block diagram illustrating an example workflow 400 that may implemented within an electronic device to support motion blur aware visual pose tracking, wherein at least a motion blur effect may be applied to a keypoint of a reference digital image, in accordance with an example implementation. In this example, techniques are illustrated which may be implemented within an electronic device 110, with possible optional process actions being illustrated using dashed lines.

In certain instances, an example workflow may begin at action 402 wherein a blurred warped patch corresponding to a reference patch within a reference image may be generated, e.g., applying the techniques provided herein to account for motion blur and warping.

At action 404, a tracker and/or other like function(s) may determine whether the blurred warped patch satisfactorily matches a portion of a digital image. As part of action 404, may be determined whether or not enough matches have been identified, e.g. to permit desired tracking of a particular object, or conversely to temporarily forgo tracking of a particular object.

Accordingly, if it is determined that there have not been enough matches to satisfy particular threshold or goal then workflow 400 may follow in iterative process illustrated by arrow 406, e.g. such that another blurred warped patch may be generated, for the same object and/or possibly a different object that may be tracked. As such, actions 402 and 404 may continue until such time it has is determined that enough matches have been identified and the workflow may end.

As illustrated, in certain implementations, additional actions may be included in workflow 400, such as action 408 with which it may be possible to measure an amount of motion blur associated with at least a part of a digital image, e.g., based on having identified certain number of matches between blurred warped patches and portions of the digital image (via actions 402 and 404). As previously mentioned, by measuring motion blur it may be possible to subsequently provide more accurately blurred warped patches, e.g., by selecting a likely estimated motion blur effect, and/or modeled pose change effect. Action 408 may be included in a loop from action 404, for example.

According to an embodiment, a blur-aware tracker of an object in a digital image may have knowledge about an amount of blur to be handled for a given camera frame. An amount of motion-blur affecting a keypoint may be a product of camera motion and exposure time. An adaptive approach for measuring motion blur may be applied in which different motion blur effects may be applied and tested with a few blurred warped patches. Based on initial matching scores/determinations, apparatus 112 and/or tracker 114 may decide which motion blur affect and/or measured amount of motion blur to assume for a current frame. Hence, action 402 may then use this measured motion blur and/or the like to generate remaining patches. Since the number of initial tests may be small compared to the overall number of matches per frame, such tests may have little influence on the overall processing time.

As illustrated, in certain implementations, additional actions may be included in workflow 400, such as action 410 wherein an image scale associated with the various digital images being processed may be affected, e.g., applying an increase or a decrease in scale.

Thus, in certain example implementations workflow 400 may be adapted for use with a multi-scale tracker. Here, for example, different scale levels may be differently affected by a motion blur effect, and/or a modeled pose change effect.

Consequently, as illustrated in FIG. 4, workflow 400 may comprise an interactive capability wherein action 410 in some manner affects an image scale to be considered, and workflow 400 returns to action 402 via illustrated line 412.

Figure 5:
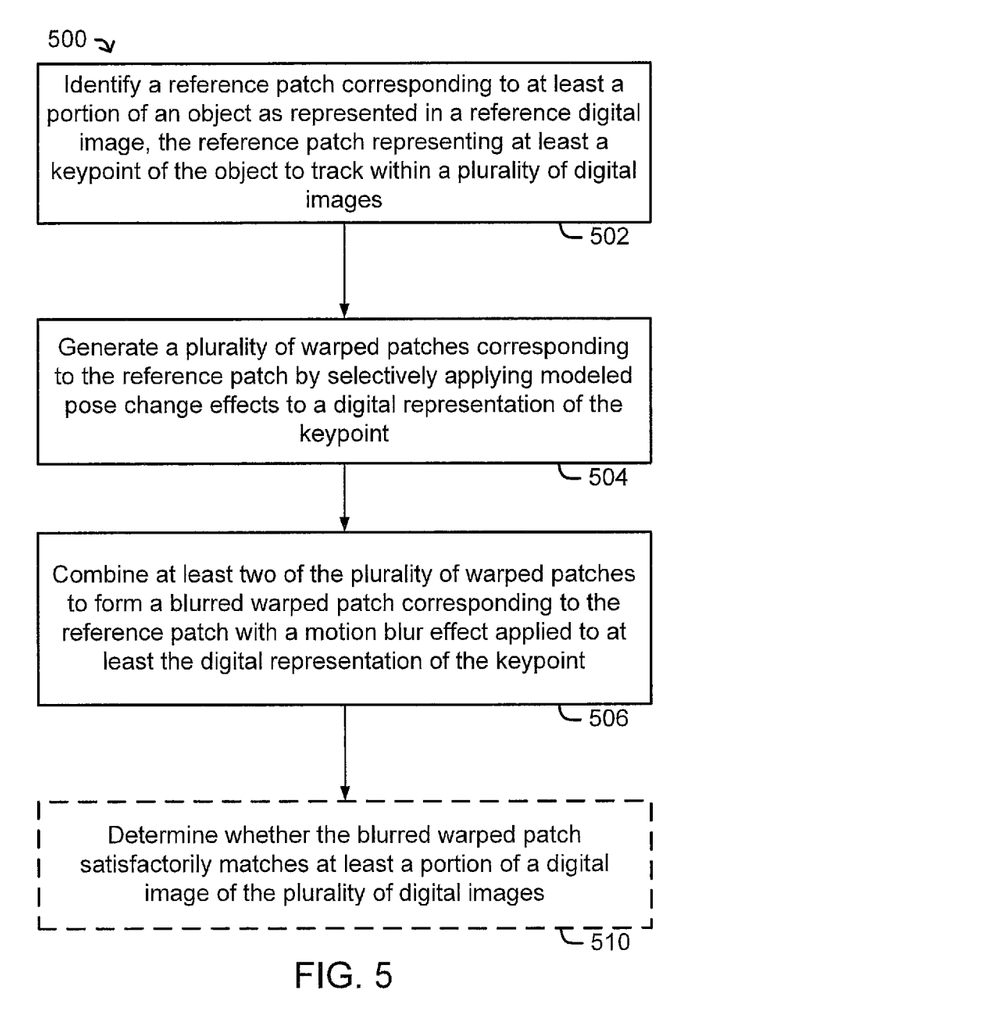
FIG. 5 is a flow diagram illustrating an example process that may be implemented within an electronic device to apply at least a motion blur effect to a keypoint of a reference digital image, in accordance with an example implementation.

With the preceding examples in mind, yet another example is illustrated in FIG. 5 as a flow diagram of a process 500 that may implemented within an electronic device to apply at least a motion blur effect to a keypoint of a reference digital image, in accordance with an example implementation.

At example block 502, a reference patch is identified which corresponds to at least a portion of an object as represented in a reference digital image. Here, for example, the reference patch may represent at least a keypoint of the object to track within sequence of digital images, a video stream, etc. At example block 504, a plurality of warped patches corresponding to the reference patch may be generated by selectively applying modeled pose change effects to a digital representation of the keypoint. At example block 506, two or more of the plurality of warped patches may be combined to form a blurred warped patch corresponding to the reference patch with a motion blur effect applied to at least a digital representation of the keypoint.

At example block 510, a determination may be made as to whether the blurred warped patch satisfactorily matches a portion of a digital image. In certain example implementations, at example block 510 an amount of motion blur may be measured, e.g., for example, based at least in part, on the motion blur effect. In certain example implementations, prior to and/or as part of process 500, a scale of at least a portion of one or more of the reference digital image, the plurality of digital image samples, and/or one or more digital images may be affected in some manner.

Figure 6:
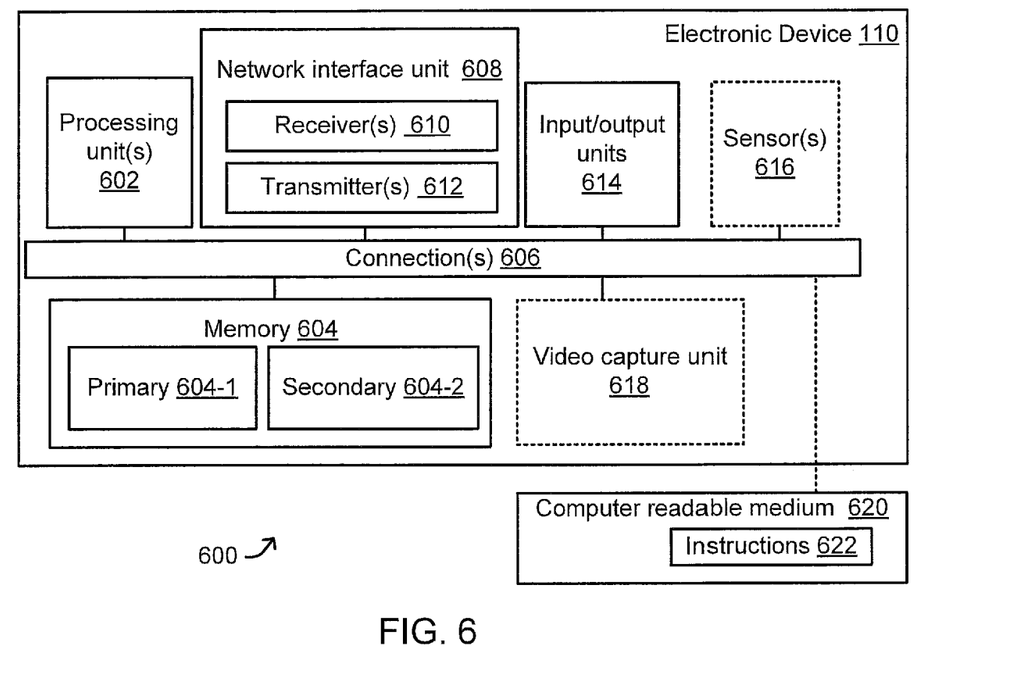
FIG. 6 is a schematic diagram illustrating certain features of an example electronic device to apply at least a motion blur effect to a keypoint of a reference digital image, in accordance with an example implementation.

Attention is drawn next to FIG. 6, which is a schematic diagram illustrating certain features of an example electronic device 110, which may take the form of an example special computing platform 600, to apply at least a motion blur effect to a keypoint of a reference digital image, in accordance with an example implementation.

As illustrated special computing platform 600 may comprise one or more processing units 602 (e.g., to perform data processing in accordance with the techniques provided herein, apparatus 112, and/or tracker 114, etc.) coupled to memory 604 via one or more connections 606. Processing unit(s) 602 may, for example, be implemented in hardware or a combination of hardware and software. Processing unit(s) 602 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 604 may be representative of any data storage mechanism. Memory 604 may include, for example, a primary memory 604-1 and/or a secondary memory 604-2. Primary memory 604-1 may comprise, for example, a random access memory, read only memory, etc. While illustrated in this example as being separate from the processing units, it should be understood that all or part of a primary memory may be provided within or otherwise co-located/coupled with processing unit(s) 602, or other like circuitry within mobile device 110. Secondary memory 604-2 may comprise, for example, the same or similar type of memory as primary memory and/or one or more data storage devices or systems, such as, for example, a disk drive, an optical disc drive, a tape drive, a solid motion state memory drive, etc In certain implementations, secondary memory may be operatively receptive of, or otherwise configurable to couple to, a non-transitory computer readable medium 620. Memory 604 and/or non-transitory computer readable medium 620 may comprise instructions 622 for use in performing data processing, e.g., in accordance with the applicable techniques as provided herein.

Special computing platform 600 may, for example, further comprise one or more network interface unit(s) 608. Network interface unit(s) 608 may, for example, comprise one or more wired and/or wireless communication interfaces, represented here by one or more receivers 610 and one or more transmitters 612. It should be understood that in certain implementations, communication interface 608 may comprise one or more transceivers, and/or the like. Further, it should be understood that although not shown, communication interface 608 may comprise one or more antennas and/or other circuitry as may be applicable given the communication interface function/capability.

In accordance with certain example implementations, network interface unit(s) 608 may, for example, be enabled for use with various wired indication networks, e.g., such as telephone system, a local area network, a wide area network, a personal area network, an intranet, the Internet, etc.

Accordance with certain example implementations network interface unit(s) 608 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 608 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN. In another aspect, a wireless transmitting device may comprise a femtocell, utilized to extend cellular telephone service into a business or home. In such an implementation, one or more mobile devices may communicate with a femtocell via a CDMA cellular communication protocol, for example, and the femtocell may provide the mobile device access to a larger cellular telecommunication network by way of another broadband network such as the Internet.

Mobile device 110 may, for example, further comprise one or more input/output units 614. Input/output units 614 may represent one or more devices or other like mechanisms that may be used to obtain inputs from and/or provide outputs to one or more other devices and/or a user of mobile device 102. Thus, for example, input/output units 614 may comprise various buttons, switches, a touch pad, a trackball, a joystick, a touch screen, a microphone, a camera, and/or the like, which may be used to receive one or more user inputs. In certain instances, input/output units 614 may comprise various devices that may be used in producing a visual output, an audible output, and/or a tactile output for a user. For example, input/output units 614 may be used to present a solicitation to the user and to obtain certain corresponding user inputs. Hence, for example, certain computer vision techniques provided herein may allow for various information relating to augmented reality, user gesture inputs, etc. to be received or displayed, etc., and which may be based, at least in part, on object identification and tracking.

Mobile device 110 may, for example, comprise one or more sensors 616. For example, sensor(s) 616 may represent one or more inertial sensors, one or more environmental sensors, etc., which may be useful in detecting aspects of the environment and/or mobile device 110. Thus for example, sensor(s) 616 may comprise one or more accelerometers, one or one or more gyroscopes or gyrometers, one or more magnetometers and/or the like, one or more barometers, one or more thermometers, etc. Further, in certain instances sensor(s) 616 may comprise one or more input devices such as a microphone, a camera, a light sensor, etc. In certain instances, a sensor-based positioning capability may provide identification of and/or affect some other process capable of identifying a current estimated motion state corresponding to a movement of mobile device 110 within the natural environment. Sensors 616 may generate analog or digital signals that may be stored in memory 604 and processed by DPS(s) (not shown) or processing unit(s) 602 in support of one or more applications such as, for example, applications directed to positioning or navigation operations.

In certain implementations, electronic device 110 may comprise an image capture unit 618 capable of capturing and/or otherwise obtaining digital images 132. Thus, for example, in certain instances image capture unit 618 may comprise camera 106, lens 108, and/or all or part of connection 109. Additionally, image capture unit 618 may comprise one or more microphones capable of capturing one or more audio channels associated with the digital images.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing," "computing," "calculating," "determining", "generating", "obtaining", "modifying", "selecting," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with an electronic device:
   identifying a reference patch corresponding to at least a portion of an object as represented in a reference digital image, said reference patch representing at least a keypoint of said object to track within a plurality of digital images;
   generating a plurality of warped patches corresponding to said reference patch by selectively applying modeled pose change effects to a digital representation of said keypoint; and
   combining at least two of said plurality of warped patches to form a blurred warped patch corresponding to said reference patch with a motion blur effect applied to at least said digital representation of said keypoint, said combining of said at least two of said plurality of warped patches being based, at least in part, on an image capture exposure time of said electronic device.

2. The method as recited in claim 1, and further comprising, with said electronic device:
   determining whether said blurred warped patch substantially matches at least a portion of a digital image of said plurality of digital images.

3. The method as recited in claim 2, and further comprising, with said electronic device:
   adaptively determining a value representing how many of said plurality of warped patches to be combined to form said blurred warped patch that substantially matches at least said portion of said digital image of said plurality of images.

4. The method as recited in claim 1, wherein generating said blurred warped patch further comprises:
   generating said blurred warped patch corresponding to said reference patch based, at least in part, on a backward mapping approach.

5. An apparatus for use in an electronic device, the apparatus comprising:
   means for identifying a reference patch corresponding to at least a portion of an object as represented in a reference digital image, said reference patch representing at least a keypoint of said object to track within a plurality of digital images;
   means for generating a plurality of warped patches corresponding to said reference patch by selectively applying modeled pose change effects to a digital representation of said keypoint; and
   means for combining at least two of said plurality of warped patches to form a blurred warped patch corresponding to said reference patch with a motion blur effect applied to at least said digital representation of said keypoint, said combining of said at least two of said plurality of warped patches being based, at least in part, on an image capture exposure time of said electronic device.

6. The apparatus as recited in claim 5, and further comprising:
   means for determining whether said blurred warped patch substantially matches at least a portion of a digital image of said plurality of digital images.

7. The apparatus as recited in claim 6, and further comprising:
   means for adaptively determining a value representing how many of said plurality of warped patches to be combined to form said blurred warped patch that substantially matches at least said portion of said digital image.

8. The apparatus as recited in claim 5, and further comprising:
   means for generating said blurred warped patch corresponding to said reference patch based, at least in part, on a backward mapping approach.

9. An electronic device comprising:
   memory; and
   a processing unit to:
   identify a reference patch corresponding to at least a portion of an object as represented in a reference digital image, said reference patch representing at least a keypoint of said object to track within a plurality of digital images;

generate a plurality of warped patches corresponding to said reference patch by selectively applying modeled pose change effects to a digital representation of said keypoint; and combine at least two of said plurality of warped patches to form a blurred warped patch corresponding to said reference patch with a motion blur effect applied at least to said digital representation of said keypoint, said combining of said at least two of said plurality warped patches being based, at least in part, on an image capture exposure time of said electronic device.

10. The electronic device as recited in claim 9, said processing unit to further:

determine whether said blurred warped patch substantially matches at least a portion of a digital image of said plurality of digital images.

11. The electronic device as recited in claim 10, said processing unit to further:

adaptively determine a value representing how many of said plurality of warped patches to be combined to form said blurred warped patch that substantially matches at least said portion of said digital image.

12. The electronic device as recited in claim 11, said processing unit to further:

generate said blurred warped patch corresponding to said reference patch based, at least in part, on a backward mapping approach.

13. An article comprising:

a non-transitory computer readable medium having stored therein computer implementable instructions executable by a processing unit in electronic device to:

identify a reference patch corresponding to at least a portion of an object as represented in a reference digital image, said reference patch representing at least a keypoint of said object to track within a plurality of digital images;

generate a plurality of warped patches corresponding to said reference patch by selectively applying modeled pose change effects to a digital representation of said keypoint; and combine at least two of said plurality of warped patches to form a blurred warped patch corresponding to said reference patch with a motion blur effect applied to at least said digital representation of said keypoint, said combining of said at least two of said plurality of warped patches being based, at least in part, on an image capture exposure time of said electronic device.

14. The article as recited in claim 13, said computer implementable instructions being further executable by said processing unit to:

determine whether said blurred warped patch substantially matches at least a portion of a digital image of said plurality of digital images.

15. The article as recited in claim 14, said computer implementable instructions being further executable by said processing unit to:

adaptively determine a value representing how many of said plurality of warped patches to be combined to form said blurred warped patch that substantially matches at least said portion of said digital image.

16. The article as recited in claim 13, said computer implementable instructions being further executable by said processing unit to:

generate said blurred warped patch corresponding to said reference patch based, at least in part, on a backward mapping approach.

* * * * *